United States Patent
Linhorst et al.

(10) Patent No.: US 8,201,852 B2
(45) Date of Patent: Jun. 19, 2012

(54) PIPE COUPLER AND GASKET WITH POSITIVE RETENTION AND SEALING CAPABILITY

(75) Inventors: Thomas A. Linhorst, St. Louis, MO (US); Corey J. Hemman, St. Louis, MO (US); Michael Lurk, St. Louis, MO (US)

(73) Assignee: Ultraflo Corporation, Ste. Genevieve, MO (US)

( * ) Notice: Subject to any disclaimer, the term of this patent is extended or adjusted under 35 U.S.C. 154(b) by 215 days.

(21) Appl. No.: 12/823,495

(22) Filed: Jun. 25, 2010

(65) Prior Publication Data

US 2010/0327576 A1 Dec. 30, 2010

Related U.S. Application Data

(60) Provisional application No. 61/220,692, filed on Jun. 26, 2009, provisional application No. 61/222,272, filed on Jul. 1, 2009.

(51) Int. Cl.
*F16L 17/00* (2006.01)
(52) U.S. Cl. ........................... 285/365; 285/409
(58) Field of Classification Search .................. 285/364, 285/365, 366, 367, 409, 420
See application file for complete search history.

(56) References Cited

U.S. PATENT DOCUMENTS

| | | | | |
|---|---|---|---|---|
| 3,664,691 | A * | 5/1972 | Nakamura | 277/615 |
| 4,858,960 | A * | 8/1989 | Pharaon | 285/91 |
| 4,893,843 | A * | 1/1990 | DeRaymond | 277/616 |
| 5,540,465 | A | 7/1996 | Sisk | |
| 5,722,666 | A | 3/1998 | Sisk | |
| 7,165,789 | B2 | 1/2007 | Burian et al. | |
| 7,828,340 | B2 * | 11/2010 | Heelan et al. | 285/409 |
| 2004/0032126 | A1 * | 2/2004 | Mackle et al. | 285/409 |
| 2005/0248098 | A1 | 11/2005 | Sisk et al. | |
| 2008/0136167 | A1 | 6/2008 | Heelan et al. | |
| 2010/0038903 | A1 * | 2/2010 | Linhorst et al. | 285/365 |
| 2010/0320758 | A1 * | 12/2010 | Sisk | 285/420 |

* cited by examiner

*Primary Examiner* — Aaron Dunwoody
(74) *Attorney, Agent, or Firm* — Matthews Edwards LLC

(57) ABSTRACT

A coupler for joining a pipe to another pipe, a tee, or other fitting, and more particularly, to a coupler which provides positive retention of the gasket about the circumference of the coupler sufficiently to precisely position and hold the gasket during placement about pipe ends and/or fittings to be coupled, and which provides controlled circumferential compression of the gasket during coupling, for positive sealing when the coupler is closed, while allowing one handed handling and operation during placement and coupling, such that the other hand can be used for supporting a pipe to be coupled, and which is operable for releasing and breaking loose the coupler and associated gasket from a pipe during uncoupling.

17 Claims, 16 Drawing Sheets

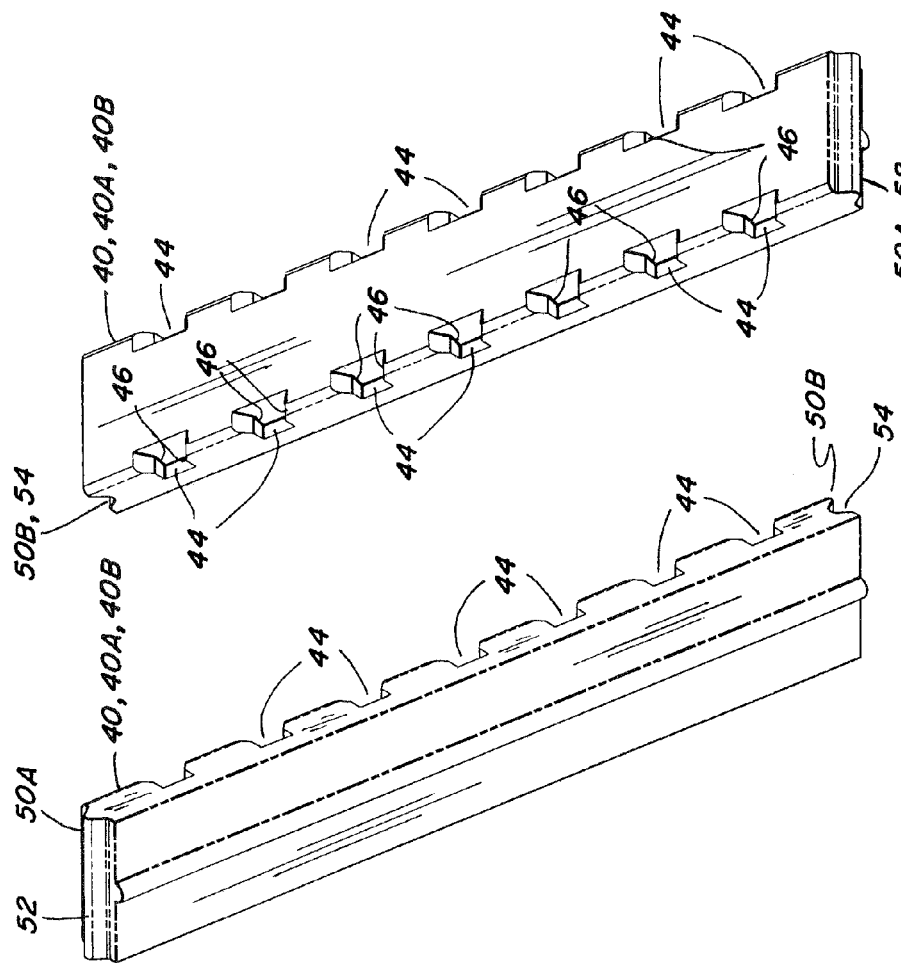
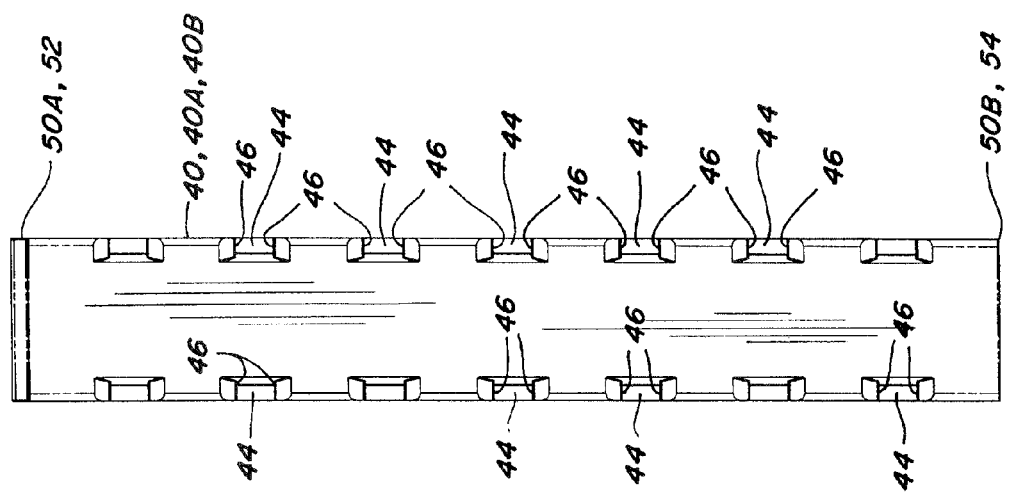

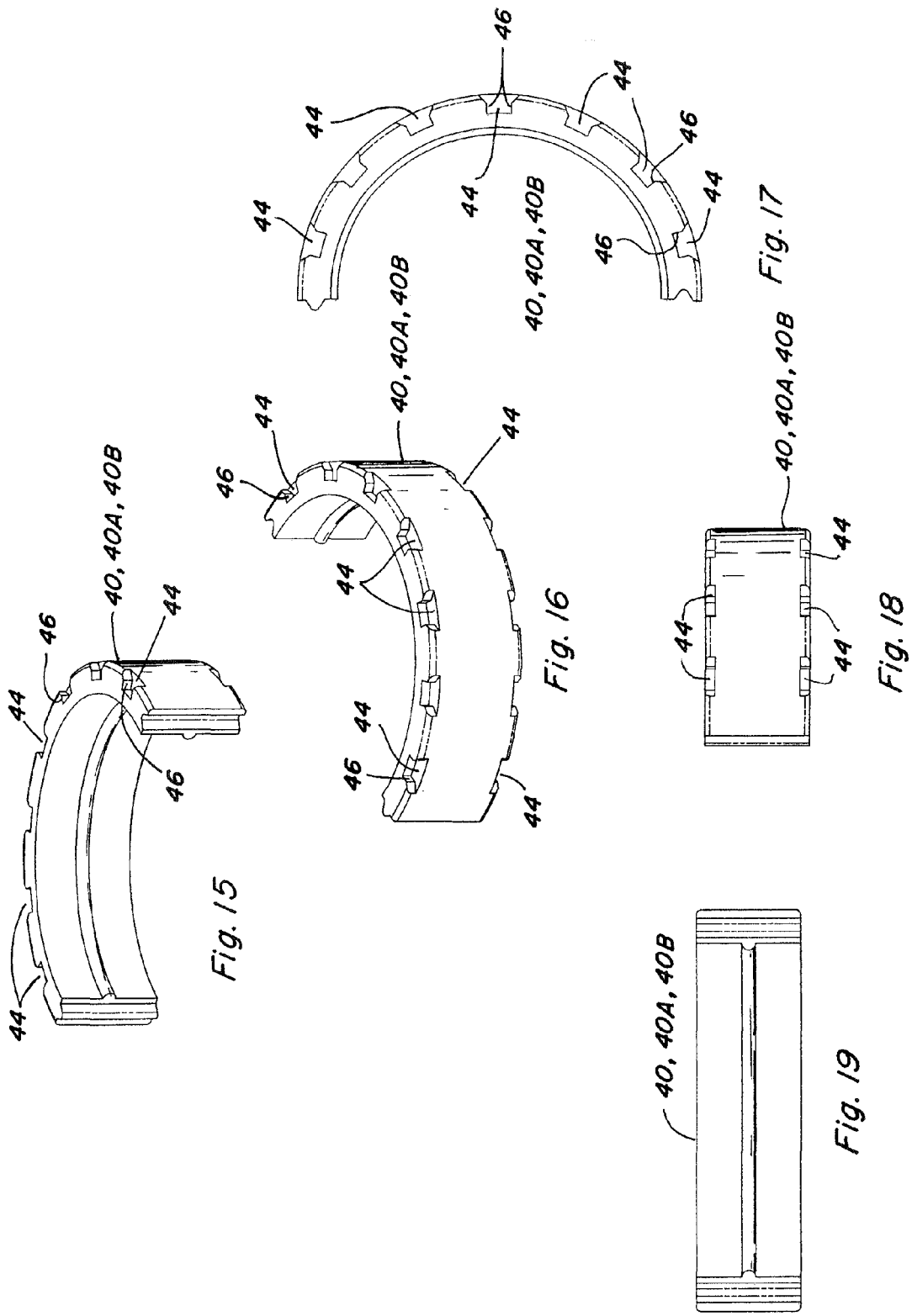

PIPE COUPLER AND GASKET WITH POSITIVE RETENTION AND SEALING CAPABILITY

This application claims the benefit of U.S. Provisional Application No. 61/220,692, filed Jun. 26, 2009, and U.S. Provisional Application No. 61/222,272, filed Jul. 1, 2009.

TECHNICAL FIELD

This invention relates generally to a coupler for joining a pipe to another pipe, a tee, or other fitting, and more particularly, to a coupler which provides positive retention of the gasket about the circumference of the coupler sufficiently to precisely position and hold the gasket during placement about pipe ends and/or fittings to be coupled, and which provides controlled circumferential compression of the gasket during coupling, for positive sealing when the coupler is closed, while allowing one handed handling and operation during placement and coupling, such that the other hand can be used for supporting a pipe to be coupled, and which is operable for releasing and breaking loose the coupler and associated gasket from a pipe during uncoupling.

BACKGROUND ART

U.S. Provisional Application No. 61/220,692, filed Jun. 26, 2009, and U.S. Provisional Application No. 61/222,272, filed Jul. 1, 2009, are incorporated herein by reference in their entirety.

Pipe couplers are well known for use in coupling pipes in sealed relation to other pipes, tees and other fittings, to provide a continuous sealed passage for the flow of fluids, including both liquids and solids, such as, but not limited to, chemicals, food products, and particulates such as cement. Such couplers are commonly used in piping systems on bulk materials transports and hoppers, for conveying fluid carried thereby. Desirable feature of such couplers include the ability to quick and easy couple and uncouple, to enable disassembly of pipes or removal of pipes from tees and the like, for purposes such as inspection, cleaning and repair. For instance, after travel to a delivery site and unloading, it may be required to uncouple the pipes of a transport or hopper for cleaning and preparing for transporting a different material. Or, it may be found that a pipe has become clogged, so as to require uncoupling for removal of the clog. Or a coupler gasket may be damaged or otherwise leaking, so as to require replacement.

Reference, Sisk U.S. Pat. Nos. 5,540,465 and 5,722,666, and U.S. Patent Publication No. 2005/0248098; Burian et al., U.S. Pat. No. 7,165,789; and Heelan et al. U.S. Patent Publication No. 2008/0136167, which disclose a variety of known hinged pipe couplers or clamp assemblies, and gaskets, some of which gaskets are annular, and some of which are semi-circular.

Problems commonly encountered when coupling pipes and fittings on bulk transports and hoppers, include that the coupler gasket can be improperly seated in the coupler as the pipes or fittings are being coupled. The pipes can be heavy, particularly when filled or partially filled with material, and thus can be hard to handle and position for coupling by one person, which can contribute to this problem. This can be particularly problematic with some couplers that require the bail of the coupler to be disconnected from the opposite side of the coupler to open the coupler sufficiently to place it on the pipe ends to be coupled, e.g., Sisk et al. and Heelan et al. patents and publications, or wherein the bail can remain connected, but can inadvertently disconnect, e.g., Burian et al. patent.

Further in the above regard, some couplers, such as that disclosed in U.S. Pat. No. 7,165,789, are designed for use with a split gasket which is positively retained by the coupler only at the ends. As a result, during coupling, as the ends of the coupler and gasket are brought together, the gasket is pulled or drawn about the ends of the pipes or pipe and fitting being coupled, to bring the split gasket ends together in sealed relation. If the gasket drags or sticks as it is pulled about the pipe ends, sealing pressure about the circumference of the coupler may be uneven. Also, because the gasket is pulled together from the ends being brought together, the opposing ends of the gasket may be in a tensile state when brought together as the coupler is closed about pipe ends being coupled, so as to form only a partial or poorly sealed condition, so as to have more of a tendency to leak.

As another problem, when uncoupling a coupler, the gasket can stick to the pipe, and/or the coupler can stick to the gasket, making removal difficult, and if force is applied, for instance, using a hammer or mallet to open the coupler, the gasket can be torn or otherwise damaged. And, if a split gasket is unavailable and instead it is attempted to use an annular gasket, the cavities are sufficiently large, particularly in sideward extent, such that annular gasket can deform into the cavities so as to leak.

Further, if the clamping mechanism of many of the known couplers is improperly adjusted, more force than normally necessary may be needed to close the coupler. Rather than properly adjust the coupler, some personnel will attempt to force the coupler closed, for instance by striking it, or using additional leverage on the handle of the clamping mechanism, e.g., by extending the length using an extender or cheater bar. This can damage the clamp, e.g., break the handle of the mechanism. And similarly, if the coupler clamping mechanism is stuck closed, some persons will attempt to pry it open by using additional leverage. This can also damage the coupler or clamping mechanism.

Regarding adjusting the clamping mechanism, some couplers, such as those of the Sisk et al. patent and publication identified above, require adjusting nuts on opposite ends of a U-shaped bail assembly, which can be time consuming and discouraging to personnel to adjust. Others, such as the Burian et al. and Heelan et al. couplers, use a single bail, but the adjusting nut is located so as to be very difficult to access, which also discourages adjustment. As a result, it has been found that many of the known couplers in use in the field are improperly adjusted, so as to be susceptible to leakage and damage.

Still further, some of the known couplers have handles that are susceptible to pinching a user's hand when closed, due to close proximity of the handle to the coupler body.

Accordingly, what is sought is a pipe coupler and gasket that overcomes one or more of the problems and shortcomings set forth above.

SUMMARY OF THE INVENTION

What is disclosed is a pipe coupler and gasket that overcomes one or more of the problems set forth above.

According to a preferred aspect of the invention, the coupler comprises a pair of generally semi-circular or clam shell elements. Each semi-circular element has a generally C-shaped profile and is configured to have a radially inwardly facing circumferential cavity or channel for receiving and holding a corresponding portion of a gasket. The semi-circular elements have first end portions hingedly connected together, and second end portions including elements of a clamping mechanism cooperatively operable for securely clamping the second end portions together.

As another preferred aspect of the invention, the gasket will be split, or semi-circular, and configured to be cooperatively received in the circumferential cavities or channels of the semi-circular elements. Additionally, the semi-circular elements include gasket retaining elements disposed at circumferentially spaced locations therealong spaced from the end portions thereof. The gasket retaining elements are matingly engageable with correspondingly located elements on the gasket, for substantially conformingly holding the gasket to the semi-circular shape of the cavities or channels, while allowing the ends of the gasket, which are to form a sealed joint with the opposing gasket end, to move generally freely, in the circumferential direction within the cavity or channel of the semi-circular elements, particularly, to an extent sufficient to allow circumferential compression hereof for forming the sealed joint. The gasket retaining elements also support or back up the free ends of the gasket so as to apply a positive, controlled or measured compressive force thereagainst as and when the coupler is closed, for forming the sealed joint between the mating ends. In this regard, the gasket can be of a multiple piece design, such as, but not limited to, a two-piece design of semi-circular pieces. In either instance, at least one pair of mating ends of the gasket will preferably coincide with the closable second end portions of the semi-circular elements of the coupler, such that when the end portions of the semi-circular elements are brought together for closing the coupler, the ends of the gasket will also be positively brought and compressed together for forming a sealed joint.

The gasket retaining elements on the semi-circular elements preferably comprise projections or raised tabs or features disposed in a circumferentially extending spaced apart array about the radial outer periphery of the cavities or channels, and the elements on the gasket comprise correspondingly located receptacles sized and shaped for receiving and engaging the retaining elements when the gasket is shaped to the circumference of the cavity or channel. In this regard, the gasket will typically comprise a flexible elastomer or rubber material with at least some resiliency, having a generally straight overall free state shape, at least initially, but can also comprise a pre-curved shape. In either instance, the gasket will typically be required to be curved or bent, at least at first, typically manually, to a curvature having a radius marginally smaller than the radius of the cavity or channel of the semi-circular element in which it is to be received and used. As a result, the circumferential surfaces defining and bounding the receptacles along the radial outer periphery will be deformed, e.g., spread apart or expanded at least marginally, so as to more easily receive the respective retaining elements. Then, when the gasket is released so as to seat in the cavity or channel, it will resiliently conform to the curved shape thereof, and compress about and grip the respective retaining elements, for retention in the cavity or channel. This retention also advantageously holds the gasket segments evenly at least about an extended intermediate region of the circumference thereof, to prevent the gasket from sliding or moving along the inner circumferences of the semi-circular elements as the semi-circular elements are closed or brought together about the ends of two pipes or a pipe and a fitting for coupling, to avoid bunching of the gasket which can interfere with or prevent closure of the coupler, and unevenly compress or load the gasket in the circumferential direction.

As another preferred feature of the gasket retaining elements, the endmost ones are configured and positioned a small predetermined circumferential distance from the respective ends of the gasket segments such that when the ends of the gasket segments are brought together in opposing, mating relation as the coupler is closed, a sufficient portion of the gasket segments adjacent to each of the ends will be free and unrestrained circumferentially within the cavity or channel, but backed up or supported circumferentially by the endmost retaining element, so as to be compressible in that direction in a limited, measured manner, to form a sealed condition with the opposing end of the gasket when they are brought together.

As a preferred feature of the clamping mechanism, it is configured to hold the second end portions of the semi-circular elements together when spread apart when the coupler is open. As a result, the coupler in the open configuration can be placed on a pipe end (without requiring sliding the gasket thereover as with an annular gasket), and held in place with just one hand without risk of the clamping mechanism coming apart, to allow the other hand to be used for handling the other pipe for positioning it for coupling. When the pipes are positioned for coupling, the clamping mechanism of the coupler can then be positioned about both pipe ends (again without sliding the gasket) and operated to clamp the coupler with just one hand, to couple the pipes together.

The clamping mechanism includes a handle pivotally connected with one of the semi-circular elements and to one end of a bail rod. The pivotal connection between to the handle and bail rod preferably comprises a clevis on the handle, with a pin extending through the clevis and the end of the bail rod. The portion of the end of the bail rod disposed in the clevis is configured to closely cooperate with the clevis, in particular, to have oppositely facing surfaces disposed in opposing relation to the sides of the clevis. This is advantageous, as it strengthens the joint so as to have the capability to withstand loading conditions, including tensile, compression, torsion and bending loads, anticipated to be encountered by the coupler during normal use.

As another preferred feature, each end of the bail rod is fixed or secured, at its pivotal connection to the handle or the other of the semi-circular elements, respectively, such that the bail rod can be pushed longitudinally, not just pulled as required for clamping. This is an advantageous feature, as it enables a manual force to be applied to the handle in the direction for unclamping the coupler, for also opening the coupler and releasing or breaking the coupler away from a pipe of fitting. This is advantageous, as it can eliminate need for striking the coupler with a hammer or the like to release it, and the possible damage that can result.

As still another preferred aspect of the invention, the bail rod of the clamping mechanism is configured so as to be adjustable in effective length between the points of attachment to the handle and the other semi-circular element, to enable easily and precisely adjusting operation of the clamping mechanism and the tension in the bail rod when clamped. Here, the term "effective length" denotes that portion of the length of the bail rod extending between the pivot points on the handle and on the other of the semi-circular elements.

As still another preferred feature of the invention, at least one pivotal connection of the clamping mechanism is releasable, to allow the coupler to be opened by a greater extent, to facilitate use with an annular gasket, and also other purposes, such as for disassembly and cleaning. Here, a preferred configuration utilizes a removable pin for pivotal connection of the bail rod to the handle, which pin can be held in place by a conventional detent, such as an E-clip or the like that is repeatedly removable.

As further preferred features of the invention, the handle has a generally C-shape when viewed from the side, including large radius edges for improved ergonomics, and such that the free end of the handle curves back toward the coupler, to provide an opening sufficiently large for receiving a gloved hand, and for reducing locations where a person's hand can be pinched against the outer side of the coupler. This shape also makes it difficult to use leverage increasing tools on the handle for closing the coupler, which can damage or break the handle or other components of the coupler.

BRIEF DESCRIPTION OF THE DRAWINGS

FIG. 10 is an end view of a segment of a gasket of the coupler;

FIG. 11 is a perspective view of the gasket segment;

FIG. 12 is another perspective view of the gasket segment;

FIG. 15 is a perspective view of a curved embodiment of the gasket segment;

FIG. 16 is another perspective view of the curved embodiment of the gasket segment;

FIG. 17 is a side view of the curved gasket segment;

FIG. 18 is an end view of the curved gasket segment;

FIG. 19 is another end view of the curved gasket segment;

DETAILED DESCRIPTION OF THE INVENTION

Figure 1:
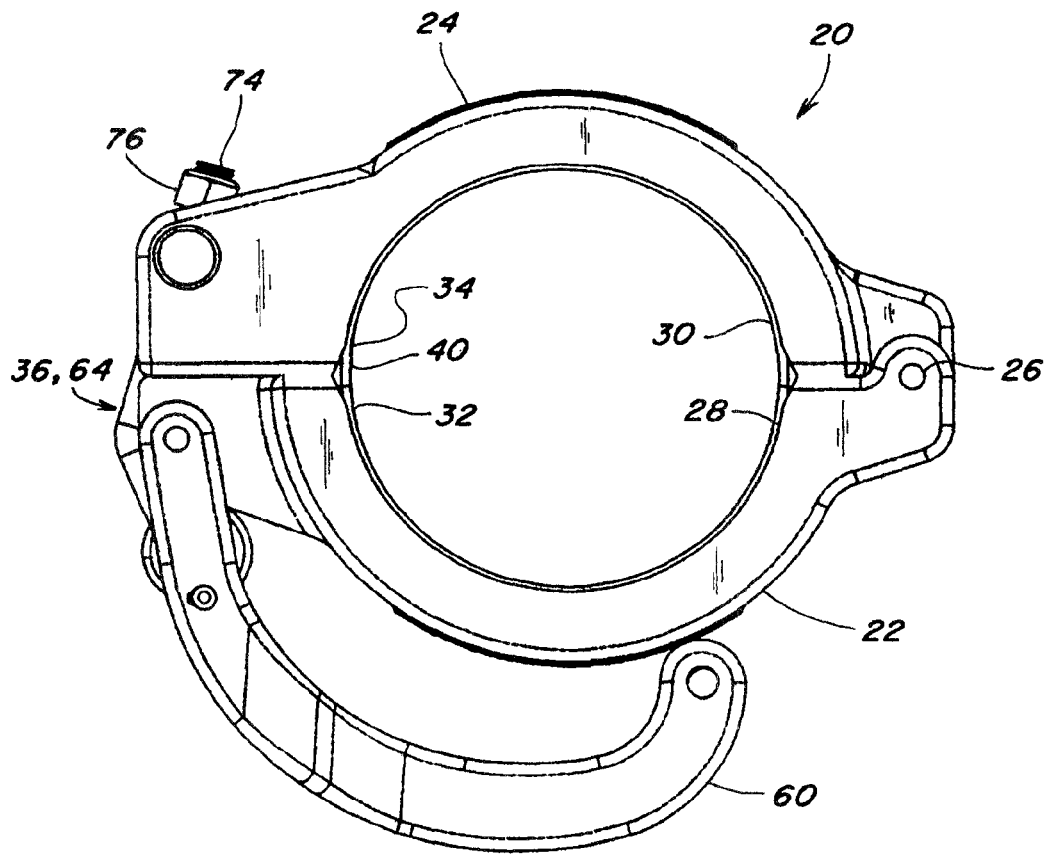
FIG. 1 is a simplified side view of a pipe coupler constructed and operable according to the teachings of the invention.

Referring to FIGS. 1 through 28, a pipe coupler 20 constructed and operable according to the teachings of the present invention, is shown. Coupler 20 includes a first semi-circular element 22, and a second semi-circular element 24, having first end portions 28 and 30, respectively, connected for relative hinged movement by a hinge joint 26. Elements 22 and 24 include second end portions 32 and 34, which are brought together when the elements are hingedly closed, and include elements of a clamping mechanism 36 operable, including with just one hand, for securing the coupler about pipe ends, or a pipe end and a fitting, to be coupled together.

Each of semi-circular elements 22 and 24 has a generally C-shaped cross-sectional shape defining a cavity 38 adapted for receiving a gasket 40. Gasket 40 is of a split configuration, here including two semi-circular gasket sections 40A and 40B, configured to be cooperatively received in cavities 38 of semi-circular elements 22 and 24, respectively. Semi-circular elements 22 and 24 include a plurality of gasket retaining elements 42 disposed within cavity 38 at circumferentially spaced locations therealong, that is, intermediate end portions 28 and 32 of first semi-circular element 22, and intermediate end portions 30 and 34 of second semi-circular element 24, configured and disposed for cooperatively engaging and retaining the respective gasket sections in cavity 38. Here gasket retaining elements 42 comprise circumferentially spaced projections, tabs or other raised features which project into cavity 38, so as to be cooperatively receivable within matingly shaped receptacles 44 disposed at corresponding locations in the outer circumferential periphery of gasket sections 40A, 40B.

Receptacles 44 on the gasket sections 40A, 40B are disposed between and partially defined or bounded by gripping surfaces 46 on the gasket sections 40A, 40B, configured for engaging opposing surfaces 48 of retaining elements 42, for gripping or holding elements 42 when the gasket section 40A, 40B is properly positioned within cavity 38 of the semi-circular element 22, 24. This gripping and retention is facilitated by the composition of gasket sections 40A, 40B, which will preferably be a resilient material such as, but not limited to, a resilient polymer, such as a synthetic rubber, natural rubber, or mixture of the two, such as but not limited to, a carboxylated nitrile or a white nitrile. Each gasket section 40A, 40B will typically have a generally straight free state shape, at least initially. The gasket sections 40A, 40B will be sufficiently resiliently bendable or flexible, so as to be conformable to the circumferential curvature of cavity 38 of the receiving semi-circular element 22, 24. Gasket sections 40A and 40B are configured so as to be capable of being flexed or bent sufficiently for insertion into cavity 38, that is, to a marginally smaller circumferential diameter than the cavity, such that receptacles 44 will be circumferentially widened sufficiently so as to more easily receive the respective gasket retaining elements 42. In this regard, at least when the respective gasket sections 40A and 40B are flexed or bent in this manner, gripping surfaces 46 bounding each receptacle 44 are configured to taper outwardly, to facilitate entry or guide elements 42 into the receptacles, and gripping surfaces 46 are depicted here as also include tapered lead in portions for this purpose. Then, when the gasket section 40A or 40B is released, the shape and resiliency thereof will cause gripping surfaces 46 on at least one side of receptacles 44 to engage surfaces 48 so as to grip and retain elements 42 in the respective receptacles, to automatically and positively seat and hold the gasket section 40A or 40B in the cavity 38. Further in this regard, although opposite ends 50A and 50B of the gasket sections 40A and 40B do not contain receptacles 44 and gripping surfaces 46, and thus are not positively engaged by or retained in cavity 38 in any way, because of the resilient composition of gasket sections 40A and 40B, and a resultant tendency or memory which urges them to assume their free state straight shape, ends 50A and 50B of the gasket sections are urged radially outwardly, against the radial outer surface of cavity 38, so as to be automatically retained therein indirectly by the positive retention of the gasket sections in the above described manner. And, if gasket sections 40A and 40B are pre-curved or develop memory so as to conform to the curvature of a particular coupler, this will also act to retain the gasket ends in the cavity, even though there is no positive or direct retention of the ends.

As an advantage of the above manner of positive retention of gasket segments 40A and 40B spaced from ends 50A and 50B, ends 50A and 50B are generally free to move circumferentially within cavity 38. This allows and facilitates circumferential compression of opposing ends 50A and 50B of gasket segments 40A and 40B as coupler 20 is closed, to enable the opposing gasket ends to form a sealed joint therebetween. Further in this regard, gasket retaining elements 42, particularly the endmost ones closest to ends 50A and 50B, are configured and positioned for circumferentially supporting or backing up ends 50A and 50B as coupler 20 is closed, for applying a positive, controlled or measured compressive force, as denoted by arrows F in FIGS. 5 and 22, thereagainst for forming the sealed condition between the mating ends 50A, 50B.

Figure 6:
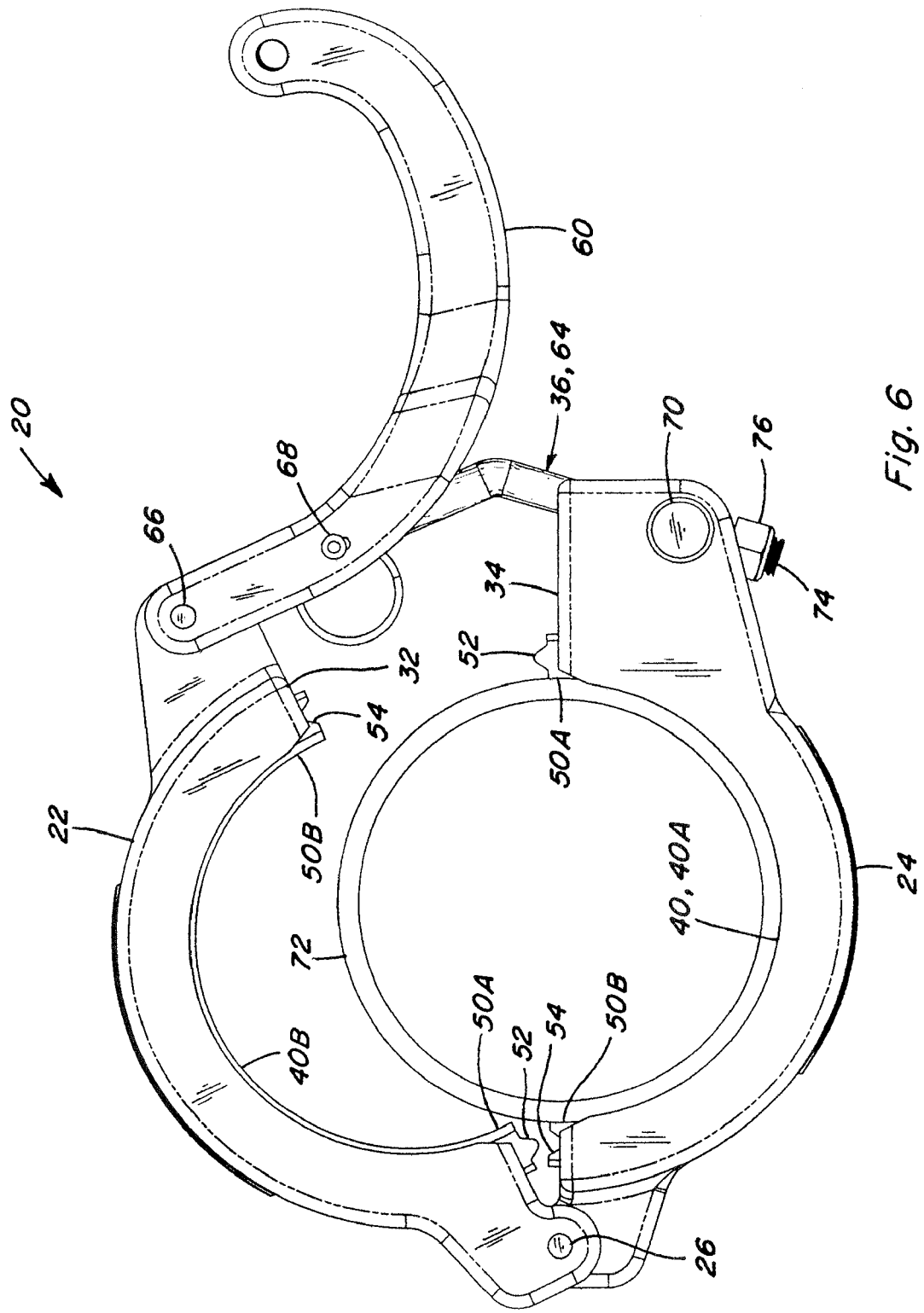
FIG. 6 is a side view of the coupler, in an open configuration.
Figure 7:
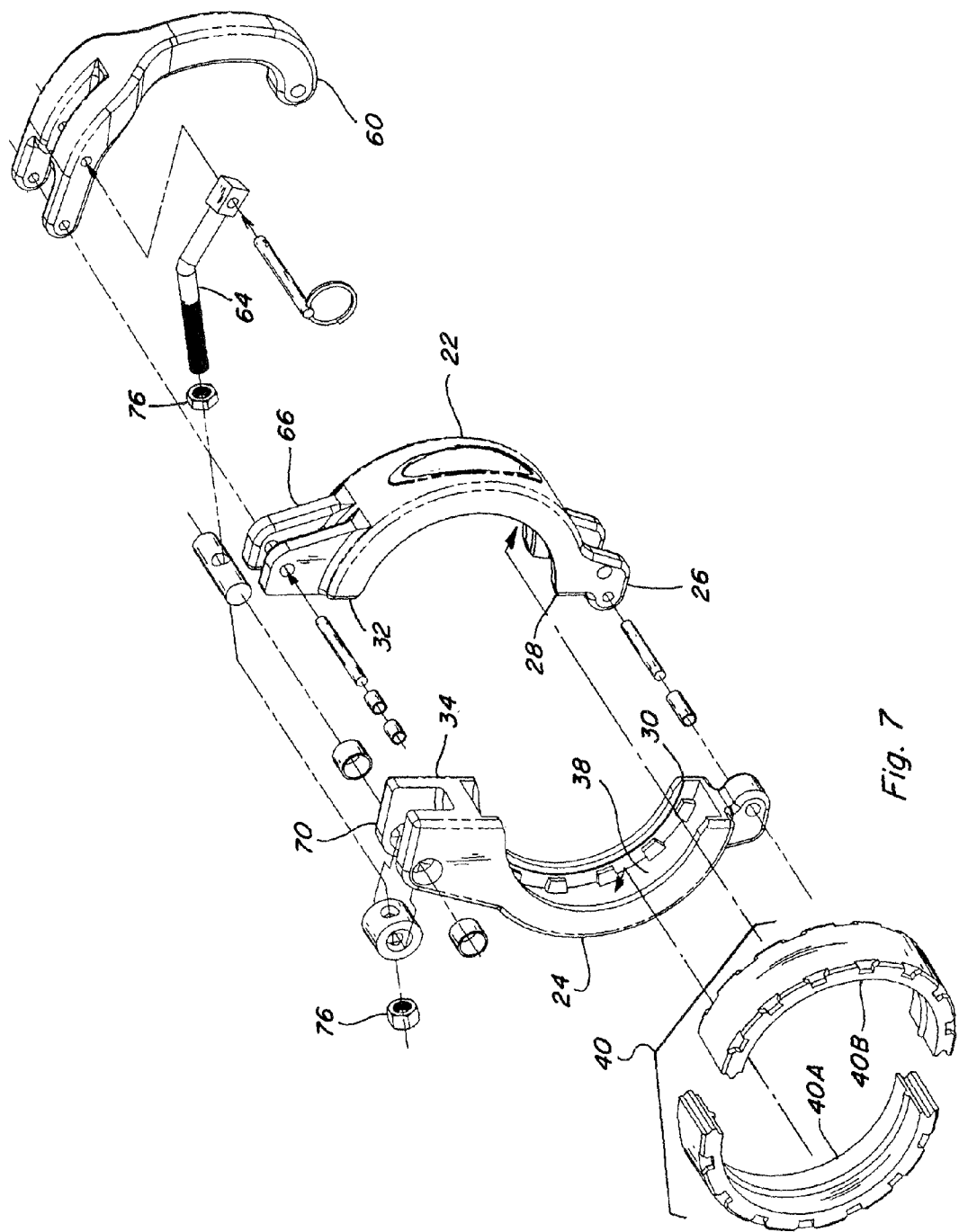
FIG. 7 is an exploded view of the coupler.
Figure 8:
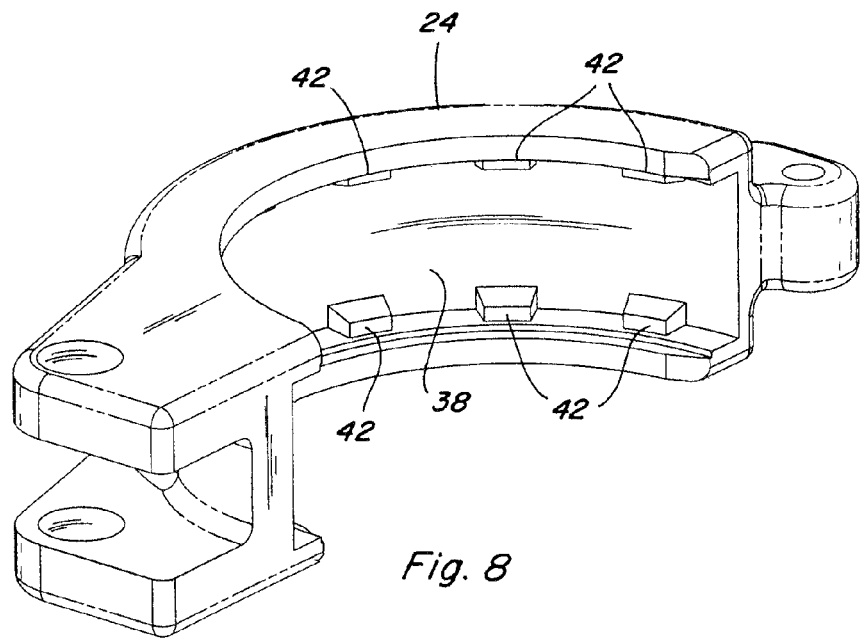
FIG. 8 is a perspective view of a semi-circular element of the coupler, showing a feature for retaining a gasket of the coupler.
Figure 9:
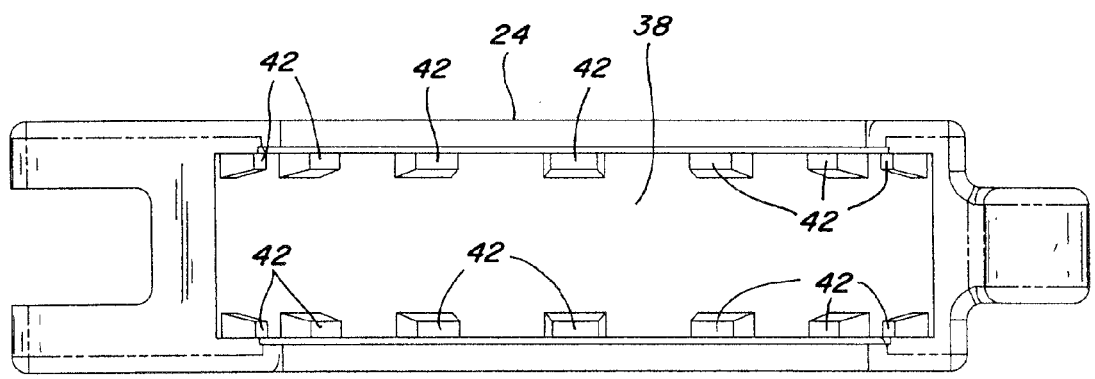
FIG. 9 is an end view of the semi-circular element.
Figure 13:
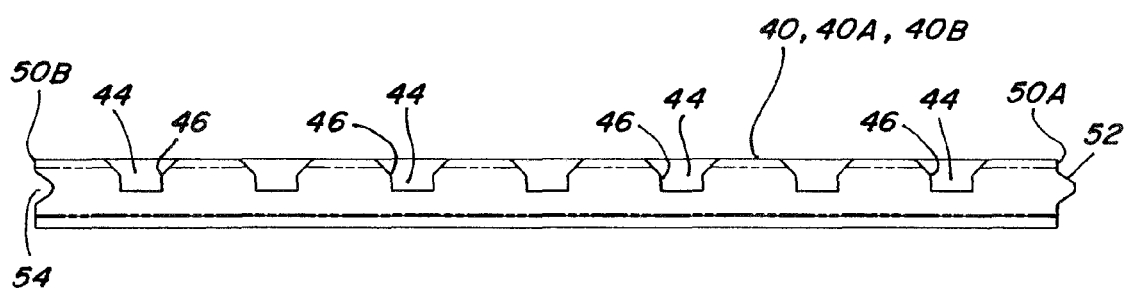
FIG. 13 is a side view of the gasket segment.
Figure 14:
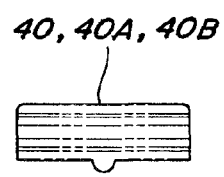
FIG. 14 is an end view of the gasket segment.
Figure 20:
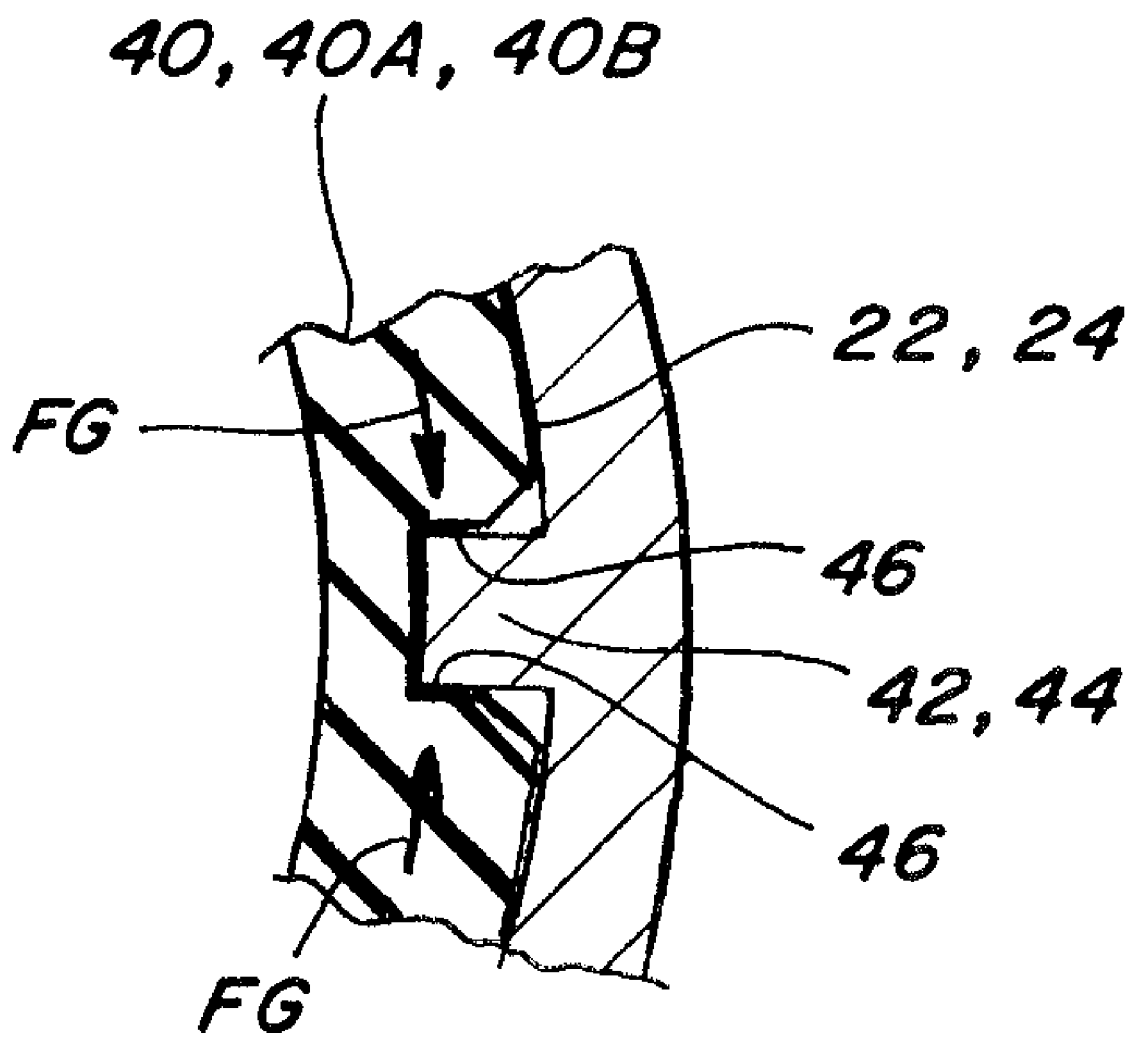
FIG. 20 is a fragmentary sectional view of the coupler showing cooperative engagement of a gasket retaining element with a gasket.
Figure 21:
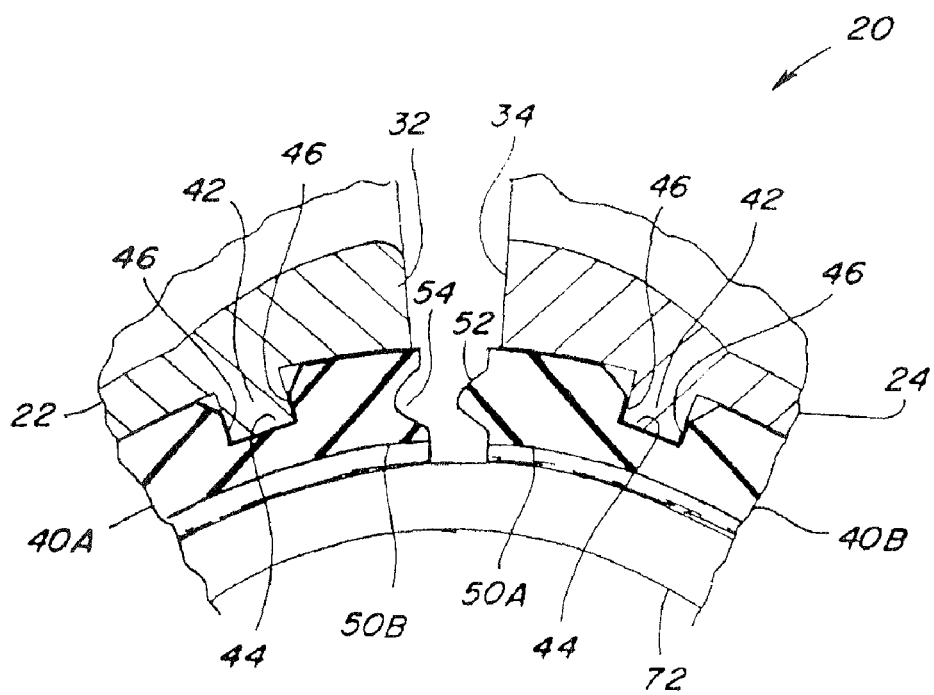
FIG. 21 is a sectional view of the coupler and gasket positioned to be closed about a pipe.

As noted above, gasket 40 can be of a multiple piece design, for instance, two or more piece such as the two piece design including gasket segments 40A and 40B. In either instance, mating ends 50A, 50B of the gasket, in their free states will be configured and positioned to extend a measured amount just marginally beyond end portions 32 and 34 of semi-circular elements 22 and 24 when open, generally about as shown in FIGS. 6 and 21, such that when end portions 32 and 34 are brought together for closing coupler 20, ends 50A and 50B of gasket segments 40A and 40B will also be brought together and compressed circumferentially for forming a sealed joint.

Here also, it can be observed that ends 50A and 50B can have a variety of different mating shapes or features for forming the sealed condition, such as but not limited to, a tapered detent 52 on one end receivable in a correspondingly shaped receptacle 54 on the mating end, mating serrations or saw teeth, or the like.

Figure 5:
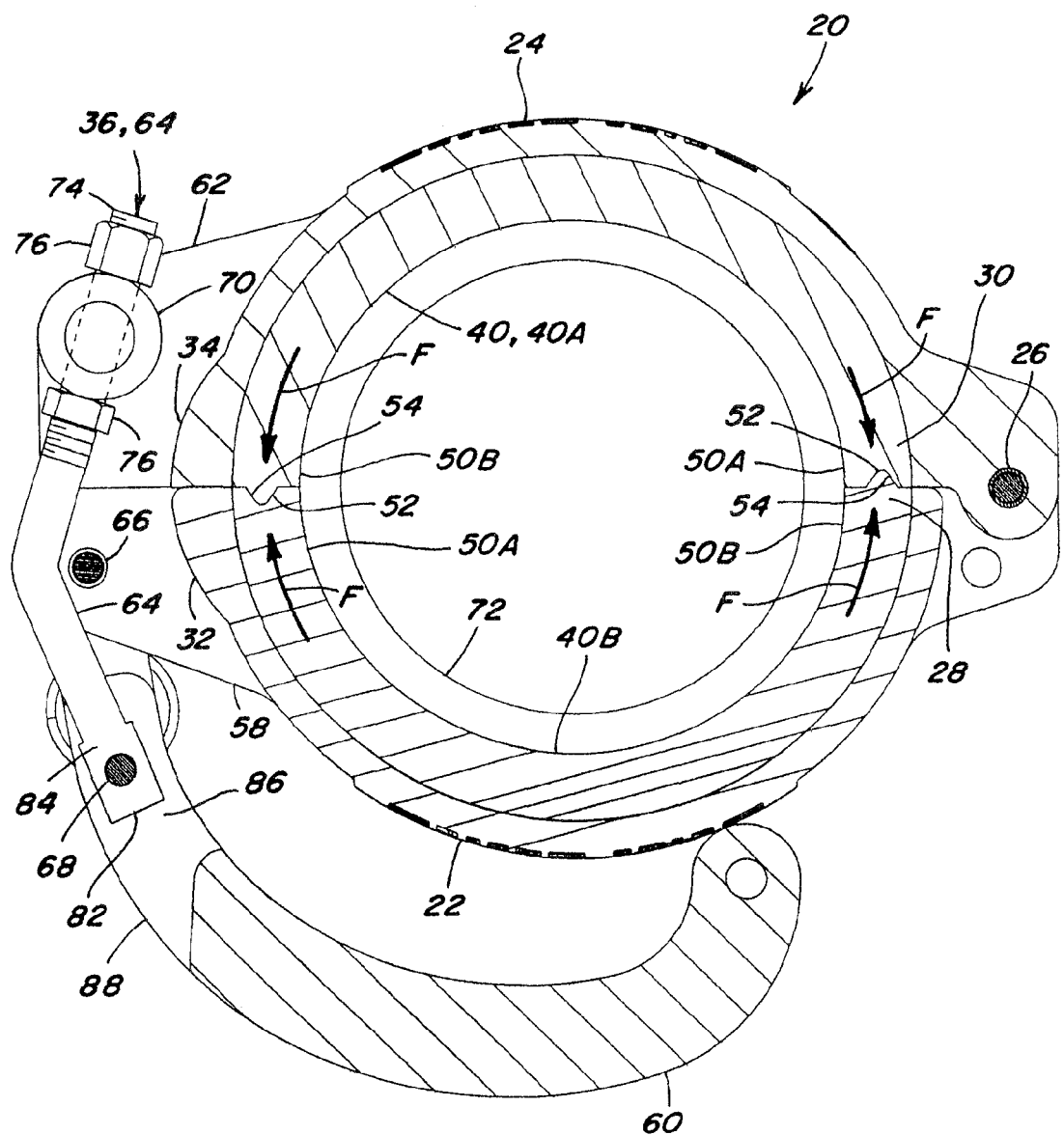
FIG. 5 is a sectional view of the coupler.
Figure 22:
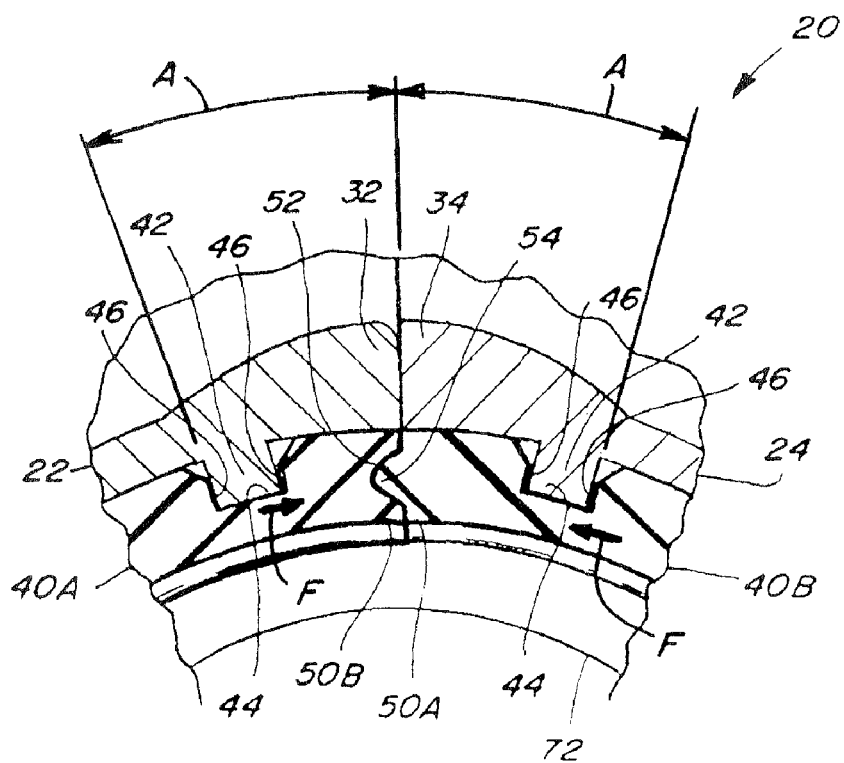
FIG. 22 is another sectional view of the coupler, closed about the pipe.

Further, referring more particularly to FIG. 22, it can be observed that the endmost gasket retaining elements 42 of each gasket segment 40A, 40B are positioned a predetermined distance, denoted by distance A, from the respective ends 50A and 50B of the gasket segments. As a non-limiting example, a distance A of about ½ inch or more has been found to be suitable for a coupler for 4 inch or 5 inch diameter pipe. This distance will be selected for a particular application, e.g., pipe diameter, gasket composition, to provide the desired measured circumferential compressibility of the gasket ends for achieving the required sealed condition therebetween when the coupler is closed. And, the lack of circumferential restraint or retention of end 50A or 50B in the bulk of distance A allows sufficient circumferential mobility of the gasket end within cavity 38 to achieve the compression and sealed interface or joint with the opposing end, without allowing lateral movement which can result in buckling, incomplete abutting contact, bulging or other potentially leak prone deformations. Forces F are also applied in this manner at the joint between the opposite ends of gasket segments 40A and 40B adjacent hinge joint 26, as illustrated in FIG. 5.

As still another feature of coupler 20, cavity 38 is configured so as to have a predetermined width between gasket retaining elements 42, forming a continuous annular channel when the coupler is closed, which is sized to alternatively receive a conventional smooth sided annular or split gasket lacking receptacles 44, in the event a gasket 40 of the invention is unavailable or is present but damaged or otherwise unusable. Additionally, cavities such as, but not limited to, those illustrated in U.S. Pat. No. 7,165,789, can be provided in the radial outer surface defining cavity 38, for receiving projections on the ends of other prior art gaskets such as disclosed in U.S. Pat. No. 7,165,789, to enable use of coupler 20 with those prior art gaskets.

Addressing clamping mechanism 36, second end portion 32 of semi-circular element 22 includes a clevis 58 configured for pivotal connection with a handle 60, which provides robustness for resisting lateral forces. Similarly, second end portion 34 of element 24 includes a clevis 62 configured for pivotal connection with a bail rod 64 of mechanism 36, which also provides robustness.

Clamping mechanism 36 is additionally configured to connect second end portions 32 and 34 of semi-circular elements 22 and 24, so as not to come apart under normal circumstances. To achieve this, handle 60 is connected by a pivotal connection 66 to clevis 58; one end of bail rod 64 is connected by a pivotal connection 68 to handle 60; and the opposite end of rod 64 is connected by a pivotal connection 70 to clevis 62. These connections are configured to not come apart under normal operating conditions. Connection 68 additionally utilizes a removable pin to allow the mechanism to be intentionally separated. The pin can be retained using any suitable detent, such as, but not limited to, a well-known E-clip. An advantage of this capability is that coupler 20 can be hung over a pipe end without danger of inadvertent disconnection, which allows a person to handle a mating pipe with both of his or her hands, and then to close coupler 20 using only a single hand, allowing the other hand to be used for supporting one of the pipe ends. Another advantage is that a hand force can be exerted against handle 60, as denoted by force arrow HF in FIG. 25 for releasing or breaking coupler 20 from a pipe, such as pipe 72 illustrated. This is advantageous, as noted above, as it eliminates need for using a tool, such as a bar, hammer, mallet or the like, for this purpose, which can damage the coupler or gasket.

Bail rod 64 of clamping mechanism 36 is configured so as to be adjustable in effective length between the points of pivotal attachment to handle 60 and second semi-circular element 24, to enable easily and precisely adjusting operation of the clamping mechanism and the tension in the bail rod when clamped. Here, the term "effective length" more particularly denotes that portion of the length of bail rod 64 extending between pivotal connections 68 and 70 on handle 60 and clevis 62. In this regard, pivotal connection 70 comprises a spacer with bushings on either end, which support a pin of connection 70 so as to be centered within clevis 62, a threaded end 74 of rod 64 extending through holes through the spacer and pin of connection 70. An adjusting nut 76 is threadedly engaged on threaded end 74 and can be threadedly loosened or tightened thereon, to adjust the effective length. Another nut 76 is also provided on the opposite side of the spacer, to snug the rod against the spacer to prevent longitudinal slippage thereof.

Here, it should be noted that pivotal connection 70 is preferably positioned within clevis 62 such that adjusting nut 76 is sufficiently accessible to be engageable by a standard tool such as a socket, box end or open end wrench, for threaded rotation about threaded end 74 of bail rod 64, including with handle 60 positioned for applying just initial tension on the bail rod, for increasing or decreasing the effective length of the bail rod.

Figure 23:
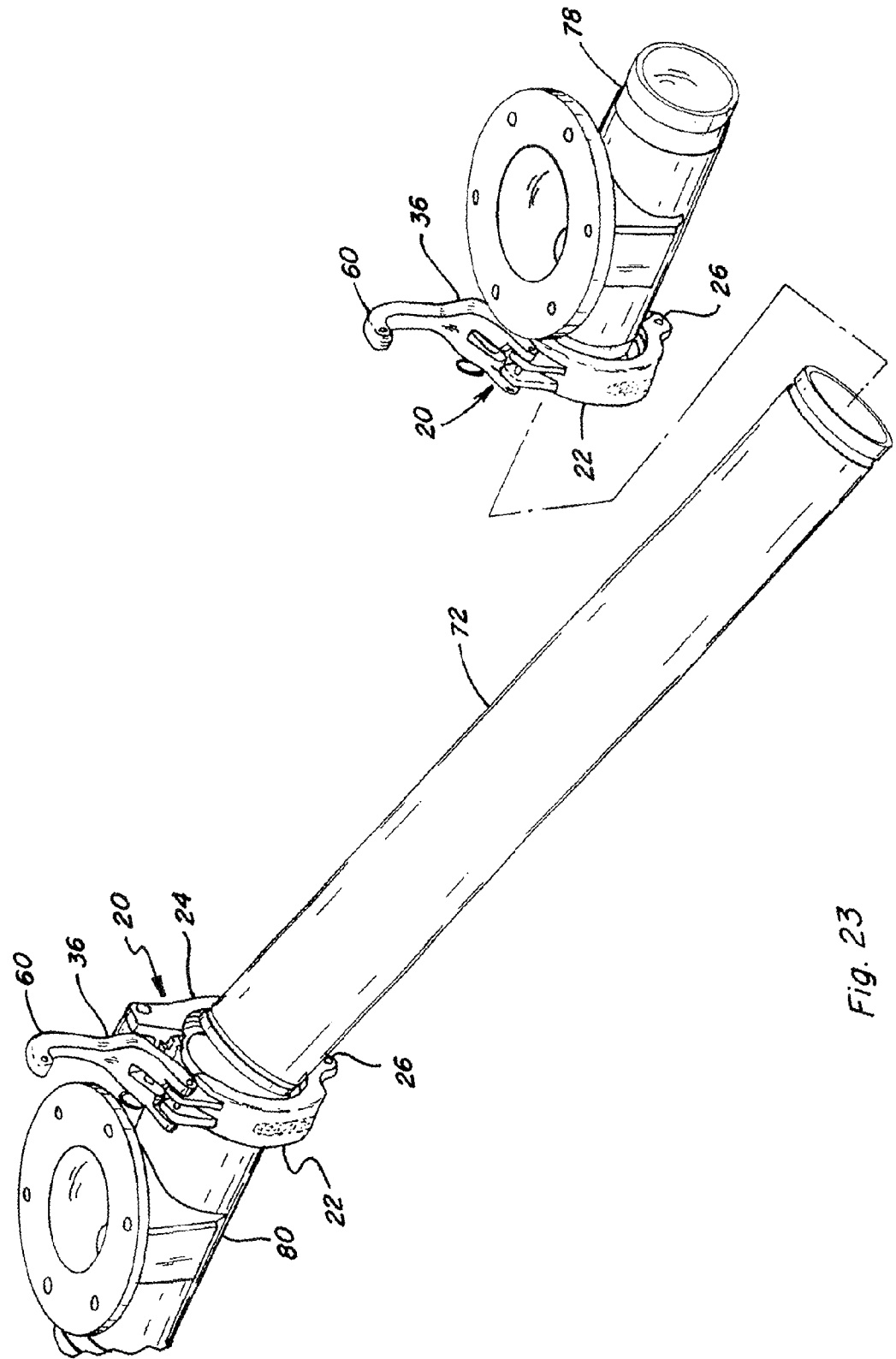
FIG. 23 shows two of the couplers positioned on fittings for coupling a pipe therebetween.
Figure 24:
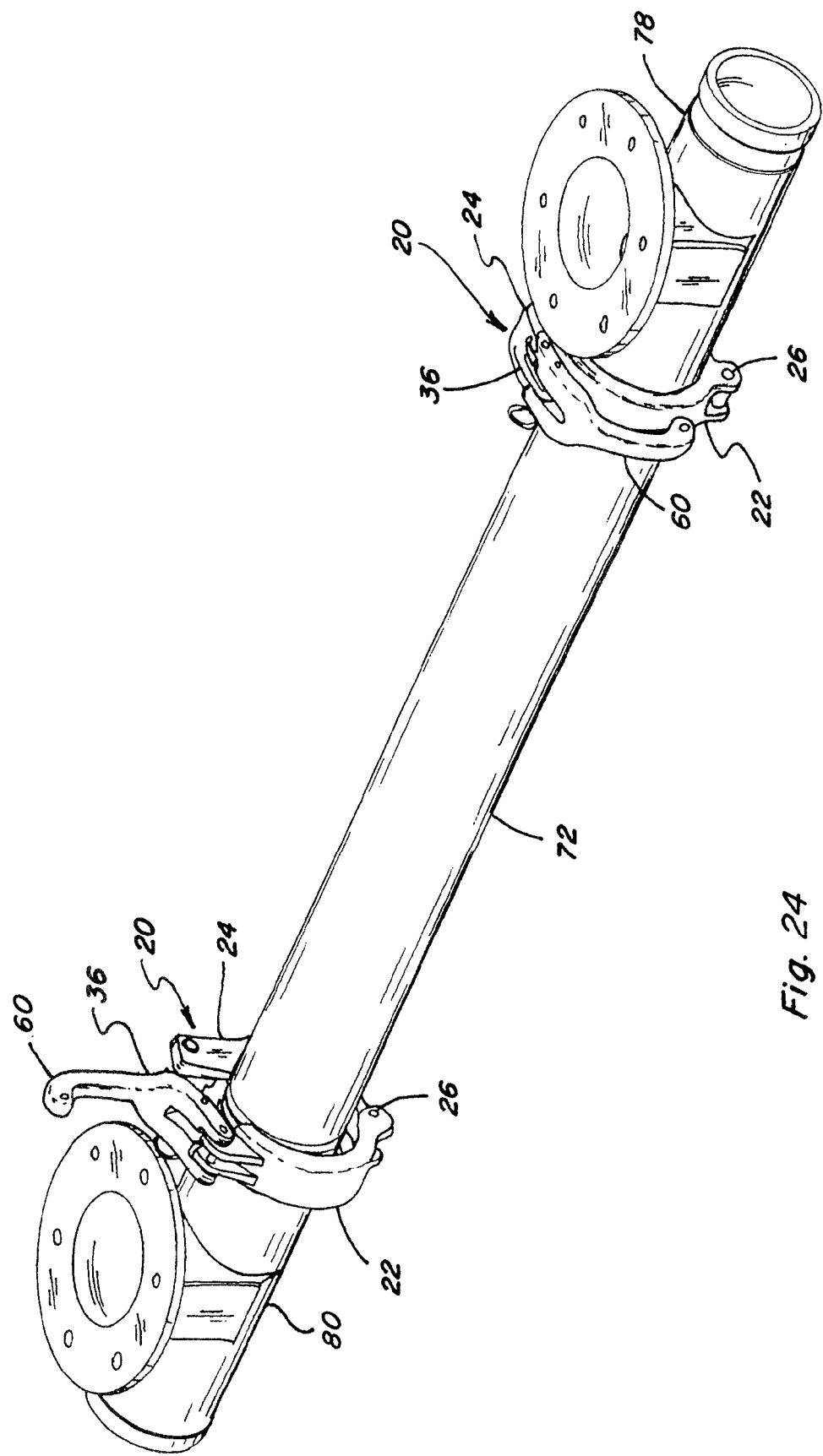
FIG. 24 shows the couplers coupling the pipe to the fittings.
Figure 25:
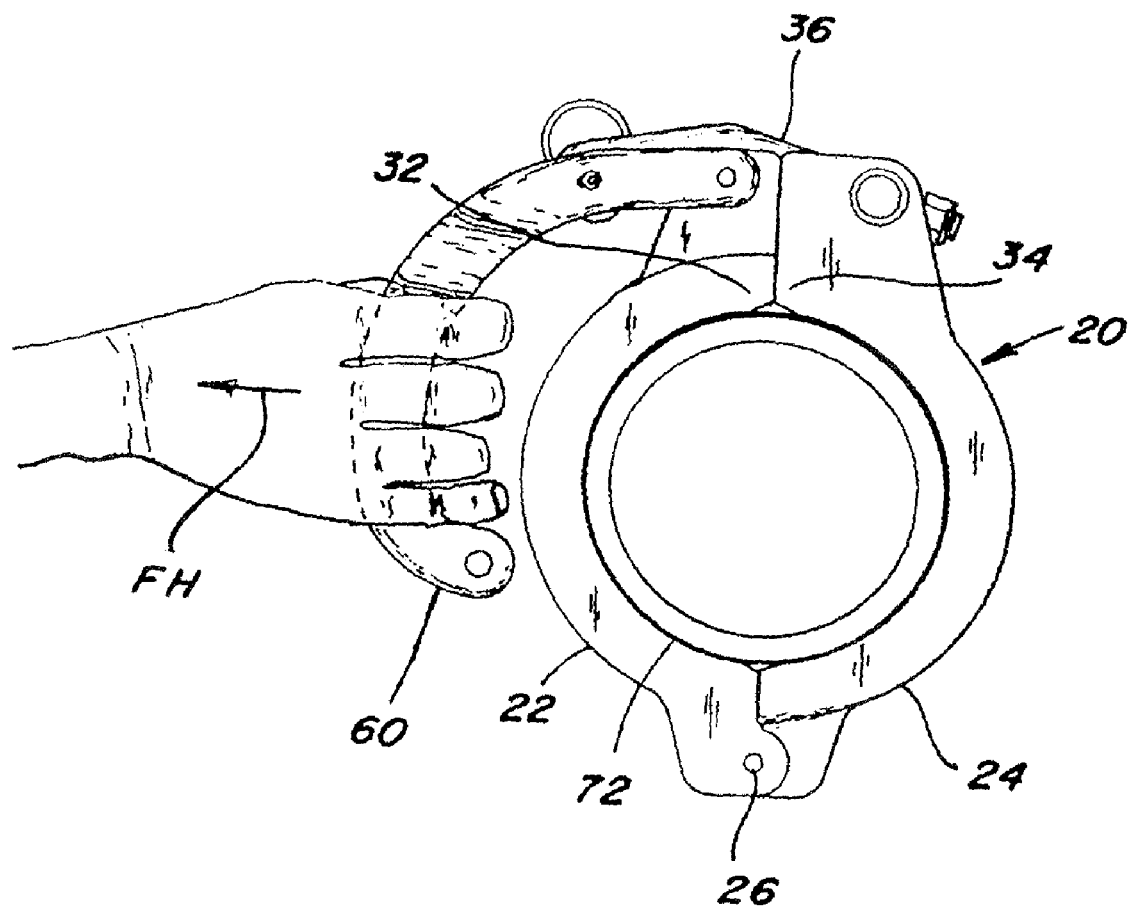
FIG. 25 is a side view of the coupler and illustrating a hand grasping the handle thereof.

In FIGS. 23 and 24, two couplers 20 are illustrated for connecting a pipe 72 to a pair of spaced apart tees 78 and 80. This is intended to be representative of tees commonly found on the lower regions of bulk material transports and the like. Here, it can be observed that the right-hand coupler 20 can be placed on the pipe end of tee 78 and left there without danger of falling, as coupler 20 will not inadvertently come apart. The left-hand coupler 20, can be placed onto a pipe end of tee 80, such that one end of pipe 72 can be laid on that coupler 20. The opposite end of pipe 72 can then be brought into alignment with the pipe end of tee 78, and that coupler moved into position over both opposing pipe ends. The right-hand coupler 20 can then be closed using just one hand on handle 60, to couple those pipe ends. The handle 60 of the left-hand coupler can then be closed to couple that coupler to complete the connection. Here, it should be emphasized that each of couplers 20 can be closed using only one hand, while the other hand is free to hold one of the pipes to be joined together. It should also be noted that as a result of the use of a split gasket, the gasket does not have to be manually fitted over the pipe ends separately of the coupler, as is required when using annular gaskets.

Handle 60 has a generally C-shape when viewed from the side, including large radius edges for improved ergonomics, and such that the free end of handle 60 curves back toward the coupler, to provide an opening sufficiently large for receiving a gloved hand, and for reducing locations where a person's hand can be pinched against the outer side of the coupler. This shape also makes it difficult to use leverage increasing tools on the handle for closing the coupler, which can damage or break the handle or other components of the coupler.

Figure 26:
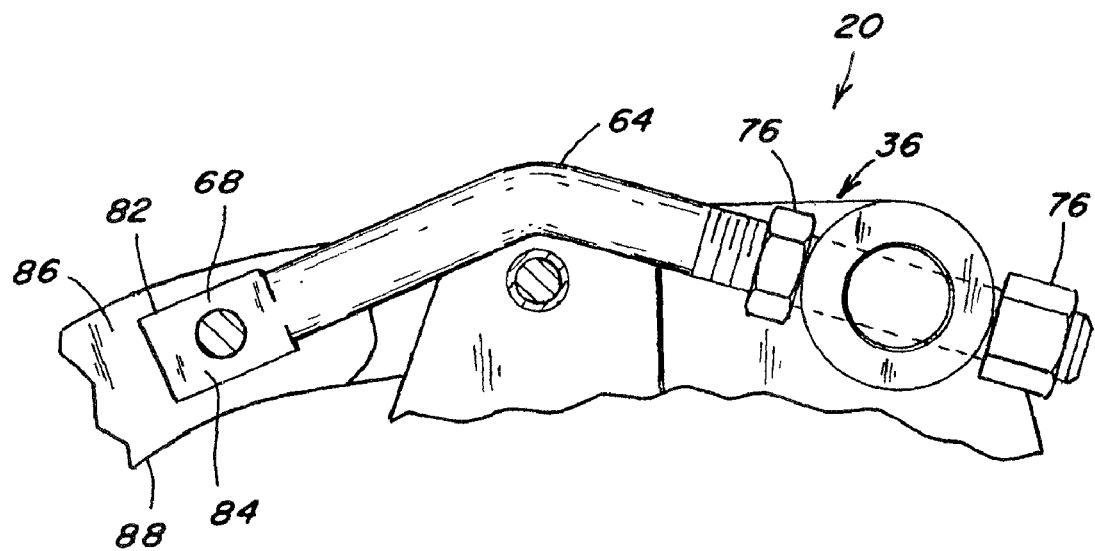
FIG. 26 is a fragmentary side view of aspects of a clamping mechanism of the coupler.
Figure 27:
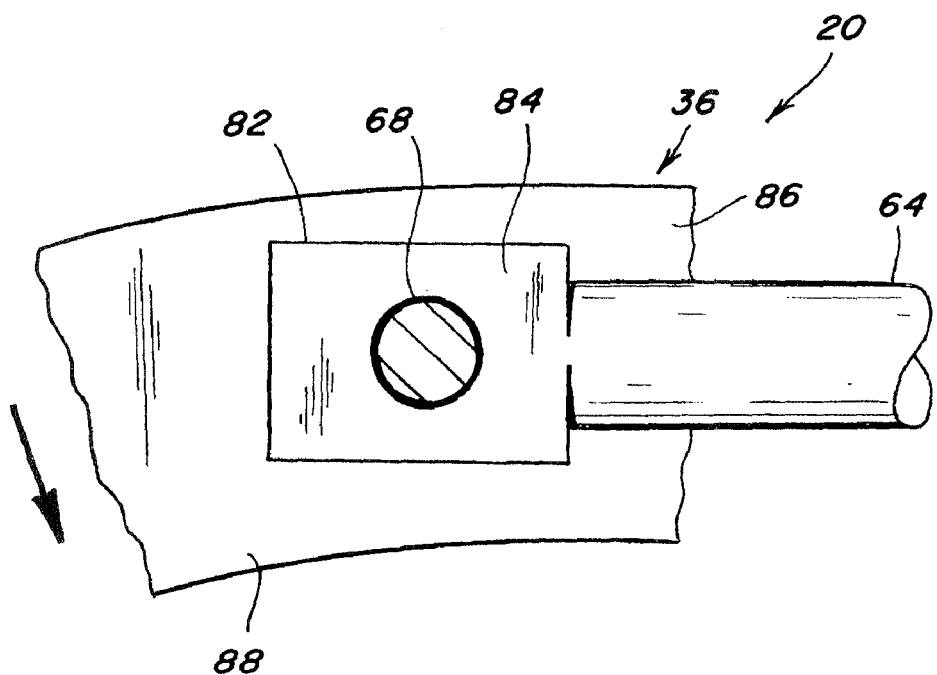
FIG. 27 is an enlarged fragmentary side view of the clamping mechanism.
Figure 28:
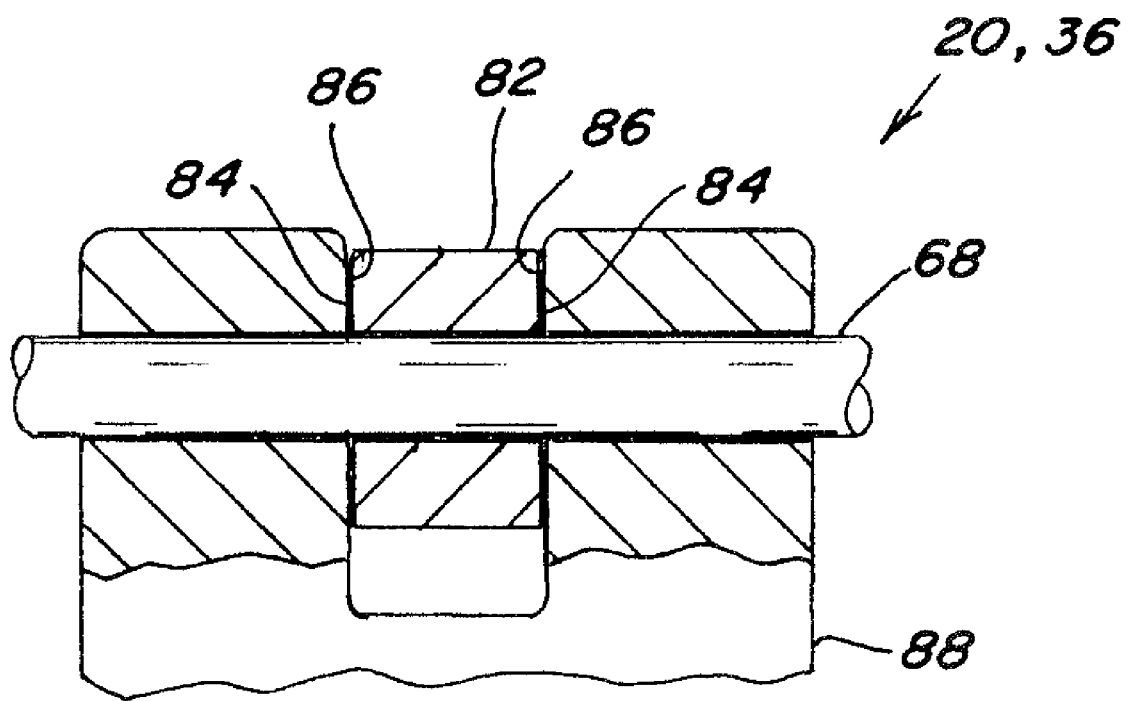
FIG. 28 is a sectional view through the clamping mechanism of the coupler.

Referring to FIGS. 26, 27 and 28, pivotal connection 68 between handle 60 and bail rod 64 preferably includes an end 82 of bail rod 64 of generally rectangular cross sectional shape, having opposing surfaces 84 disposed in opposing, closely spaced relation to surfaces 86 of a clevis 88 of handle 64, to prevent torsional or twisting movements of bail rod 64 within the clevis and to provide robust strength and avoid stress concentrations resulting from loading conditions including tensile, compression, torsion and bending loads, anticipated to be encountered by the coupler during normal use. Also, as a result of the use of rectangular end 82, more surface contact is maintained between that end and the pin therethrough.

Figure 2:
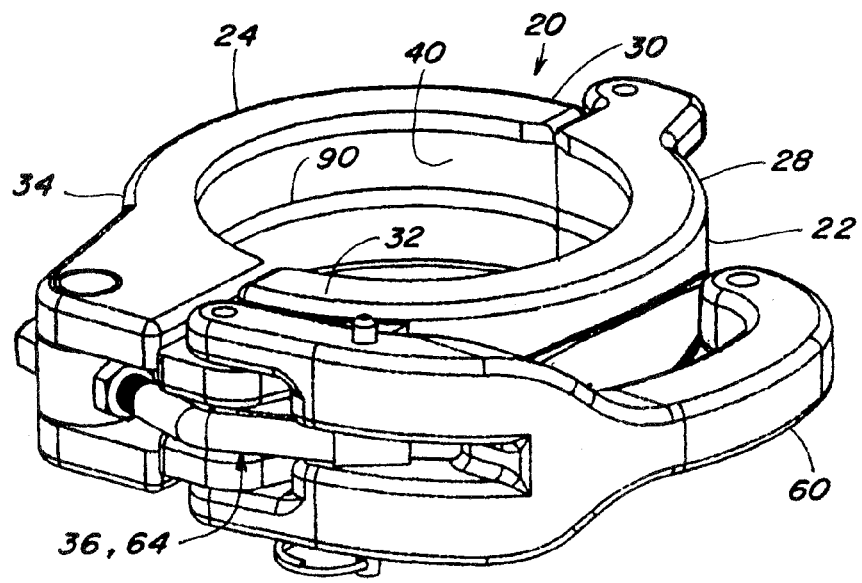
FIG. 2 is a perspective view of the coupler of FIG. 1.
Figure 3:
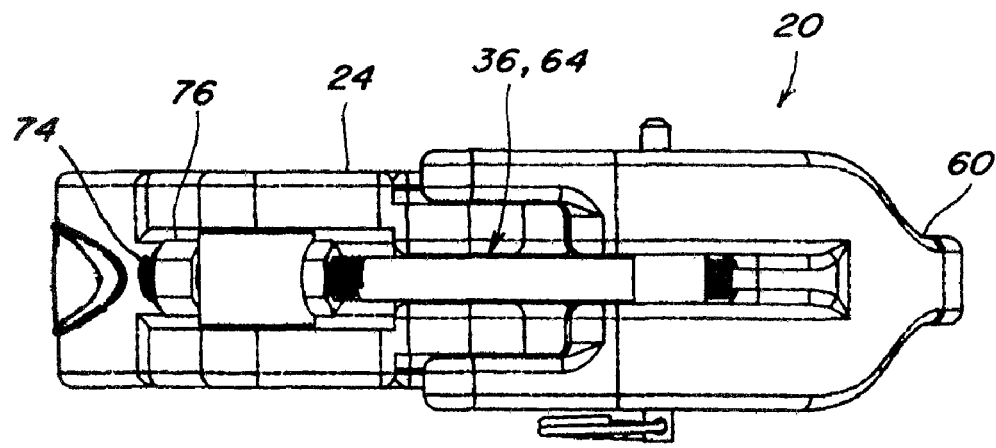
FIG. 3 is an end view of the coupler.
Figure 4:
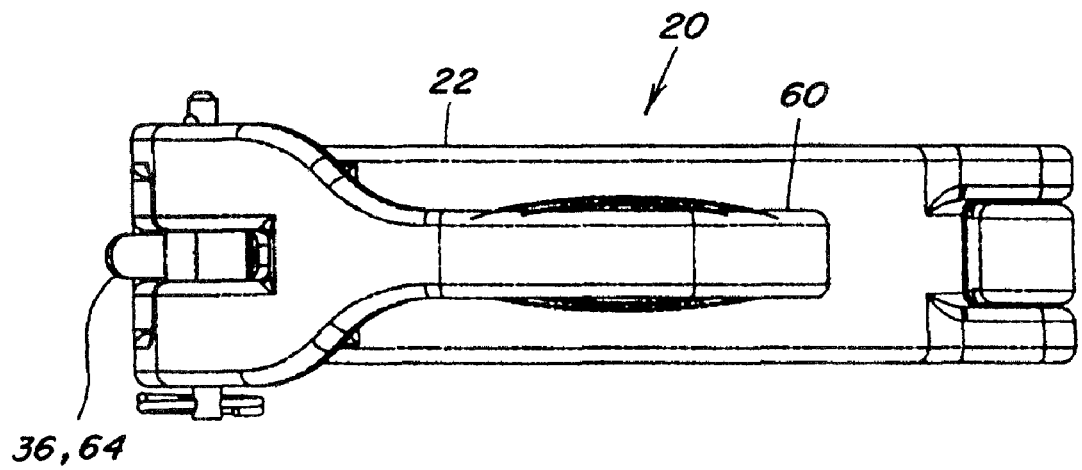
FIG. 4 is another end view of the coupler.

Still further, it should be noted that gasket 40 can have a variety of different sectional shapes, and/or surface features for contacting and forming a sealed condition about a pipe end or fitting, such as, but not limited to, a single ridge or bead 90 as illustrated in FIG. 2, as well as multiple beads, ridges, and the like. Additionally, gasket retaining elements 42 and receptacles 44 can have a variety of cooperating shapes other than that shown, including but not limited to, a rounded shape, a tapered shape, or the like. Still further, while coupler 20 is shown including 4 gasket retaining elements 42 for retaining each gasket segment 40A and 40B, it is contemplated that other numbers of elements 42 could be used. Elements 42 on opposite sides of the gasket are also illustrated as being directly opposite, but could be circumferentially offset or otherwise alternatively positioned.

While the embodiment of the invention disclosed herein is presently considered to be preferred, various changes and modifications can be made without departing from the spirit and scope of the invention.

In light of all the foregoing, it should thus be apparent to those skilled in the art that there has been shown and described a novel pipe coupler and gasket with positive sealing and gasket retention capability. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A pipe coupler comprising:
   a pair of generally semi-circular elements, each of the semi-circular elements having a generally C-shaped profile and a radially inwardly facing circumferential cavity, the semi-circular elements having first end portions hingedly connected together, and second end portions which are spaced apart when the coupler is open and include elements of a clamping mechanism configured and operable for securely clamping the second end portions together for closing the coupler;
   a gasket cooperatively received in the circumferential cavities of the semi-circular elements, the gasket being split so as to have ends about coincident with the second end portions of the semi-circular elements, respectively, the semi-circular elements including gasket retaining elements disposed at circumferentially spaced locations therealong spaced from at least the second end portions thereof, respectively, and matingly engaged with correspondingly located elements on the gasket, conformingly holding the gasket to the semi-circular shape of the cavities, while allowing the ends of the gasket to move generally freely in the circumferential direction within the cavities, respectively, when the coupler is open and such that as the coupler is closed the ends of the gasket will be brought together with a controlled compressive force applied thereagainst by the semi-circular elements for forming a sealed joint between the ends.

2. The pipe coupler of claim 1, wherein the gasket is of one piece construction, and endmost ones of the gasket retaining elements of the semi-circular elements are configured and operable for applying the compressive force against the ends as the ends are brought together.

3. The pipe coupler of claim 1, wherein the gasket is of two piece construction having additional opposing ends about coincident with the first end portions of the semi-circular elements, and additional endmost ones of the gasket retaining elements of the semi-circular elements are configured and operable for applying a compressive force against the additional ends as the additional ends are brought together when the coupler is closed, for forming a sealed joint therebetween.

4. The pipe coupler of claim 1, wherein the gasket retaining elements are configured and disposed to apply the controlled compressive force circumferentially against the ends of the gasket as the second end portions are clamped together.

5. The pipe coupler of claim 1, wherein the gasket retaining elements comprise tabs projecting radially into the cavities, respectively, and the elements on the gasket comprise circumferentially spaced receptacles having shapes configured for matingly receiving and gripping the tabs, respectively.

6. The pipe coupler of claim 5, wherein the gasket comprises resilient gripping surfaces bounding the receptacles which resiliently exert circumferentially directed gripping forces against the tabs, respectively.

7. The pipe coupler of claim 1, wherein the clamping mechanism connects and holds the second end portions together when the coupler is open to allow placing the coupler about ends of pipes to be clamped together, and the clamping mechanism is configured to be closable using one hand for clamping the second end portions together.

8. The pipe coupler of claim 1, wherein the clamping mechanism comprises a bail rod pivotally connected between one of the semi-circular elements and a handle connected to another of the semi-circular elements in a manner such that the bail rod can be pulled by the handle for closing the coupler and clamping the second end portions together about ends of pipes to be coupled, and such that the bail rod can be pushed by the handle when opening the coupler to unclamp the second end portions and break the gasket away from pipes coupled together by the coupler.

9. The pipe coupler of claim 8, wherein the bail rod is connected to at least the one of the semi-circular elements or the handle by a pin which is removable to allow disconnecting the bail rod therefrom.

10. The pipe coupler of claim 1, wherein the gasket retaining elements project radially inwardly from radially inwardly facing surfaces within the circumferential cavities of the semi-circular elements, respectively, to define a continuous circumferential channel through the cavity configured for cooperatively receiving an annular gasket.

11. A pipe coupler comprising:
a pair of generally semi-circular elements, each of the semi-circular elements having a generally C-shaped profile and a radially inwardly facing circumferential cavity, the semi-circular elements having first end portions hingedly connected together, and second end portions connected together by a clamping mechanism configurable in an open mode with the second end portions in spaced apart relation, and in a closed mode clamping the second end portions together, the semi-circular elements including gasket retaining elements in the circumferential cavities thereof disposed at circumferentially spaced locations therealong, endmost ones of the gasket retaining elements being spaced predetermined distances from at least the second end portions of the semi-circular elements, respectively;
a gasket cooperatively received in the circumferential cavities of the semi-circular elements, the gasket being split so as to have circumferentially compressible ends which when the second end portions are unclamped extend marginally circumferentially from the second end portions of the semi-circular elements, respectively, the gasket retaining elements being matingly received in correspondingly located receptacles in the gasket so as to conform and hold the gasket to the semi-circular shape of the cavities while allowing the ends of the gasket to move in the circumferential direction within the cavities, respectively, and the endmost ones of the gasket retaining elements being configured and operable to apply a controlled circumferential force to compress the ends of the gasket together when the second end portions are clamped together by the clamping mechanism to form a sealed joint between the ends.

12. The pipe coupler of claim 11, wherein the gasket is of two piece construction having additional opposing ends about coincident with the first end portions of the semi-circular elements, and additional endmost ones of the gasket retaining elements of the semi-circular elements are configured and operable to apply a controlled circumferential force to compress the additional ends of the gasket together when the second end portions are clamped together by the clamping mechanism to form a sealed joint between the additional ends.

13. The pipe coupler of claim 11, wherein the gasket retaining elements comprise tabs projecting radially into the cavities, respectively, and the receptacles in the gasket are bounded by surfaces configured for matingly gripping the tabs, respectively.

14. The pipe coupler of claim 11, wherein the clamping mechanism is configured to be closable using one hand for clamping the second end portions together.

15. The pipe coupler of claim 11, wherein the clamping mechanism comprises a bail rod pivotally connected between one of the semi-circular elements and a handle connected to another of the semi-circular elements in a manner such that the bail rod can be pulled by the handle for closing the coupler and clamping the second end portions together about ends of pipes to be coupled, and such that the bail rod can be pushed by the handle when opening the coupler to unclamp the second end portions and break the gasket away from pipes coupled together by the coupler.

16. The pipe coupler of claim 15, wherein the bail rod is connected to at least the one of the semi-circular elements or the handle by a pin which is removable to allow disconnecting the bail rod therefrom.

17. The pipe coupler of claim 11, wherein the gasket retaining elements project radially inwardly along opposite axially facing surfaces within the circumferential cavities of the semi-circular elements, respectively, to define a continuous circumferential channel between the retaining elements through the cavity configured for cooperatively receiving an annular gasket.

* * * * *